US011040722B2

(12) United States Patent
Miyahara et al.

(10) Patent No.: US 11,040,722 B2
(45) Date of Patent: Jun. 22, 2021

(54) DRIVING AUTHORIZATION TRANSFER DETERMINATION DEVICE

(71) Applicant: MITSUBISHI ELECTRIC CORPORATION, Tokyo (JP)

(72) Inventors: Tadashi Miyahara, Tokyo (JP); Mitsuo Shimotani, Tokyo (JP); Yoshitaka Nakamura, Tokyo (JP); Naohiko Obata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 113 days.

(21) Appl. No.: 16/320,739

(22) PCT Filed: Oct. 3, 2016

(86) PCT No.: PCT/JP2016/079238
§ 371 (c)(1),
(2) Date: Jan. 25, 2019

(87) PCT Pub. No.: WO2018/066023
PCT Pub. Date: Apr. 12, 2018

(65) Prior Publication Data
US 2020/0017118 A1 Jan. 16, 2020

(51) Int. Cl.
*B60W 50/08* (2020.01)
*B60K 28/06* (2006.01)
(Continued)

(52) U.S. Cl.
CPC ............ *B60W 50/08* (2013.01); *B60K 28/06* (2013.01); *B60W 30/182* (2013.01); *B60W 40/08* (2013.01); *B60W 2040/0818* (2013.01)

(58) Field of Classification Search
CPC .... B60W 50/08; B60W 30/182; B60W 40/08; B60W 2040/0818; B60W 50/14;
(Continued)

(56) References Cited

U.S. PATENT DOCUMENTS 5,774,069 A 6/1998 Tanaka et al.
2014/0300478 A1 10/2014 Kume et al.
(Continued)

FOREIGN PATENT DOCUMENTS

JP 9-161196 A 6/1997
JP 2003032329 A * 1/2003
(Continued)

OTHER PUBLICATIONS

English_Translation_JP2016115356A (Year: 2016).*
(Continued)

*Primary Examiner* — Peter D Nolan
*Assistant Examiner* — Ashley L Redhead, Jr.
(74) *Attorney, Agent, or Firm* — Birch, Stewart, Kolasch & Birch, LLP

(57) ABSTRACT

The present invention has an object to provide a technology of determining whether a driver is prepared for transfer of driving authorization, and then determining whether transfer of driving authorization is acceptable or unacceptable. The present invention is intended for a driving authorization transfer determination device. The device includes a task request part that makes an output device inside the vehicle output a request for a task involving continuous speech or body movement for a predetermined period of time, a task acquisition part that acquires an accomplishment result of the task from an input device inside the vehicle, a transfer determination part that determines whether the transfer is acceptable or unacceptable based on the accomplishment result of the task, and a determination result output part that outputs a determination result of the transfer determination part to the automated driving controller.

12 Claims, 13 Drawing Sheets

(51) Int. Cl.
*B60W 30/182* (2020.01)
*B60W 40/08* (2012.01)

(58) Field of Classification Search
CPC ..... B60W 2540/227; B60W 2540/223; B60W 60/0053; B60K 28/06; B60K 2370/1438; B60K 2370/1476; B60K 2370/73; B60K 2370/741; B60K 2370/62; B60K 37/06; B60K 35/00; B60K 2370/143
See application file for complete search history.

(56) References Cited

U.S. PATENT DOCUMENTS

| | | | | |
|---|---|---|---|---|
| 2014/0309870 | A1* | 10/2014 | Ricci | G06F 3/017 701/36 |
| 2016/0161946 | A1* | 6/2016 | Wuth Sepulveda | G05D 1/0022 701/2 |
| 2016/0371977 | A1* | 12/2016 | Wingate | G08G 1/096844 |
| 2017/0217445 | A1* | 8/2017 | Tzirkel-Hancock | B60W 50/10 |
| 2017/0364070 | A1 | 12/2017 | Oba | |
| 2018/0079358 | A1* | 3/2018 | Kelly | G08B 6/00 |

FOREIGN PATENT DOCUMENTS

| | | | |
|---|---|---|---|
| JP | 2005-1643 A | 1/2005 | |
| JP | 2005-352895 A | 12/2005 | |
| JP | 2008-22537 A | 9/2008 | |
| JP | 2014-203345 A | 10/2014 | |
| JP | 2016-115356 A | 6/2016 | |
| JP | 2016115356 A * | 6/2016 | ........... G05D 1/0061 |
| JP | 2016-132302 A | 7/2016 | |

OTHER PUBLICATIONS

English_Translation_JP2003032329A (Year: 2003).*
International Search Report (PCT/ISA/210) issued in PCT/JP2016/079238, dated Dec. 20, 2016.
Office Action dated Oct. 23, 2019 in corresponding Japanese Application No. 2018-543481 with an English Translation.

* cited by examiner

DRIVING AUTHORIZATION TRANSFER DETERMINATION DEVICE

TECHNICAL FIELD

The present invention relates to a technology of determining whether transfer of vehicle driving authorization from an automated driving controller to a driver is acceptable or unacceptable.

BACKGROUND ART

In recent years, developments have been made on automated driving system that controls various actuators related to vehicle travelling control to reduce a driving load on a driver. There are a plurality of stages concerning vehicle driving automation achieved by the automated driving system. For example, the Cabinet Office of Japan defines the stages, i.e., levels of automation, as follows:

Level 0: Manual driving where a driver constantly handles operations of all of the main control systems of acceleration, steering, and braking.

Level 1: A system handles one operation of acceleration, steering, and braking.

Level 2: A system handles two or more operations of acceleration, steering, and braking.

Level 3: A system handles operations of all of acceleration, steering, and braking. A driver handles the operations when the system requests.

Level 4: A driver handles neither operation of acceleration, steering, nor braking. An entity other than a driver handles all of the operations.

The description of the invention is herein given based on the levels of automation defined in the above. However, the definition is one example, and the present invention can be applied to levels of automation according to other definitions as well.

When the level of automation is lowered during travelling of a vehicle, that is, when at least a part of vehicle driving authorization is transferred from the automated driving system to the driver, a driving load on the driver is increased. For this reason, the following technology is proposed such that the driver can smoothly respond to vehicle driving after driving authorization is transferred. For example, Patent Document 1 discloses an automated driving controller that predicts time to reach an interchange where switching from automated driving to manual driving is intended, and gives notification to prompt a driver to perform switching operation at a timing earlier than the reaching time by a transfer period of time that is required to perform the operation to switch from automated driving to manual driving.

PRIOR ART DOCUMENT

Patent Document

Patent Document 1: Japanese Patent Application Laid-Open No. 9-161196 (1997)

SUMMARY

Problem to be Solved by the Invention

According to the technology of Patent Document 1, a voice message is output, or a seat or a steering wheel is vibrated to give notification to prompt switching operation. A driver can thus be woken up to be prepared for transfer of driving authorization.

The technology of Patent Document 1, however, cannot confirm whether or not the driver is actually woken up to be prepared for transfer of driving authorization. Therefore, there is a problem in that, if the notified driver is not prepared, the driver cannot smoothly respond to driving operation after transfer of driving authorization.

In view of the problem above, the present invention has an object to provide a technology of determining whether a driver is prepared for transfer of driving authorization, and then determining whether transfer of driving authorization is acceptable or unacceptable.

Means to Solve the Problem

The present invention is intended for a driving authorization transfer determination device that determines whether transfer of driving authorization from an automated driving controller of a vehicle to a driver is acceptable or unacceptable. The device includes a task request part that makes an output device inside the vehicle output a request for a task involving continuous speech or body movement for a predetermined period of time, a task acquisition part that acquires an accomplishment result of the task from an input device inside the vehicle, a transfer determination part that determines whether the transfer is acceptable or unacceptable based on the accomplishment result of the task, and a determination result output part that outputs a determination result of the transfer determination part to the automated driving controller.

The present invention is intended for a driving authorization transfer determination method of determining whether transfer of driving authorization from an automated driving controller of a vehicle to a driver is acceptable or unacceptable. The method includes making an output device inside the vehicle output a request for a task involving continuous speech or body movement for a predetermined period of time, acquiring an accomplishment result of the task from an input device inside the vehicle, determining whether the transfer is acceptable or unacceptable based on the accomplishment result of the task, and outputting a determination result as to whether the transfer is acceptable or unacceptable to the automated driving controller.

Effects of the Invention

According to the driving authorization transfer determination device of the present invention, the task acquisition part acquires an accomplishment result of a task involving continuous speech or body movement for a predetermined period of time from the input device inside the vehicle, and the transfer determination part determines whether transfer from the automated driving controller to the driver is acceptable or unacceptable based on the accomplishment result of the task. Therefore, it is possible to determine whether the driver is prepared for transfer of driving authorization based on the accomplishment result of the task, and then determine whether transfer of driving authorization is acceptable or unacceptable.

According to the driving authorization transfer determination method of the present invention, an accomplishment result of a task involving continuous speech or body movement for a predetermined period of time is acquired from the input device inside the vehicle, and whether transfer is acceptable or unacceptable is determined based on the accomplishment result of the task. Therefore, it is possible to determine whether the driver is prepared for transfer of driving authorization based on the accomplishment result of the task, and then determine whether transfer of driving authorization is acceptable or unacceptable.

These and other objects, features, aspects and advantages of the present invention will become more apparent from the following detailed description of the present invention when taken in conjunction with the accompanying drawings.

DESCRIPTION OF EMBODIMENTS

First Embodiment

Figure 1:
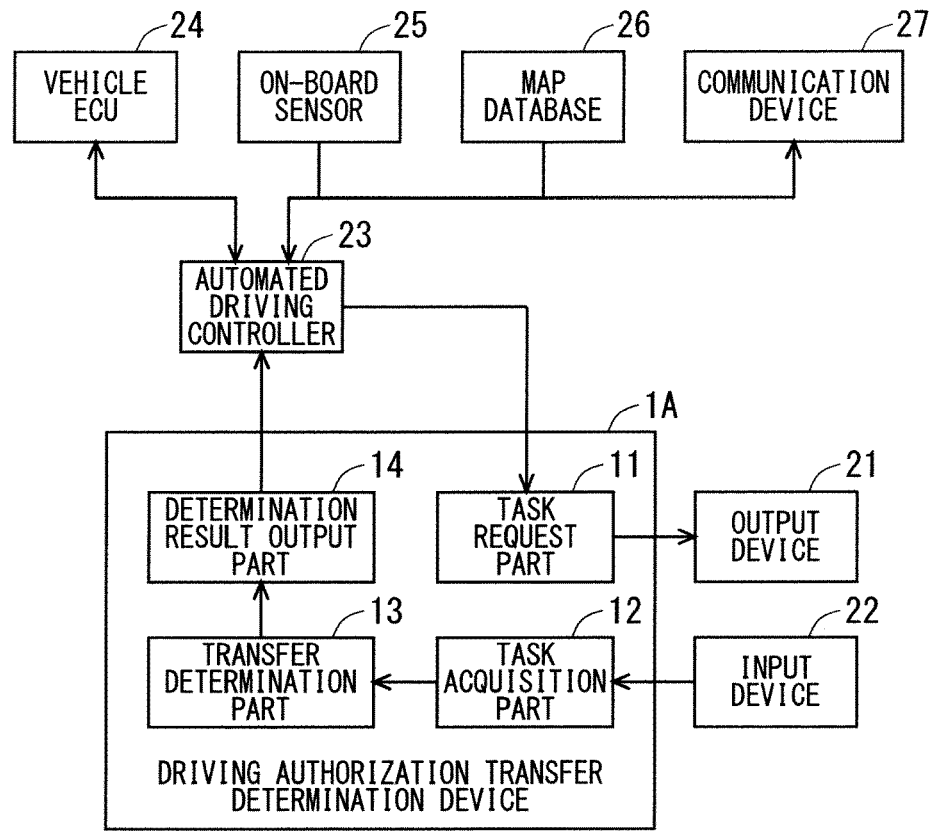
FIG. 1 is a block diagram showing a configuration of a driving authorization transfer determination device according to a first embodiment.

FIG. 1 is a block diagram showing a configuration of a driving authorization transfer determination device 1A according to a first embodiment. The configuration of the driving authorization transfer determination device 1A according to the first embodiment is described below with reference to FIG. 1.

The driving authorization transfer determination device 1A determines whether transfer of at least a part of driving authorization from an automated driving controller 23 to a driver is acceptable or unacceptable in a vehicle where the automated driving controller 23 performs automated driving control. The expression "at least a part of driving authorization" herein signifies that whether the transfer is acceptable or unacceptable is determined in all situations where the level of automation is switched to a lower level. For example, according to the above definition of the levels of automation, when Automation Level 3 or 4 is switched to Automation Level 0, the entire driving authorization concerning acceleration, steering, and braking is transferred from the automated driving controller 23 to a driver. In contrast, when Automation Level 3 or 4 is switched to Automation Level 1 or 2, only a part of driving authorization of acceleration, steering, and braking is transferred from the automated driving controller 23 to a driver. The driving authorization transfer determination device 1A determines whether transfer is acceptable or unacceptable in all these situations.

The automated driving controller 23 determines behavior of a vehicle based on information from an on-board sensor 25 that is mounted on a vehicle, map data acquired from a map database 26, and traffic information or information about other vehicles such as VICS (trademark) information acquired from a communication device 27, and then controls various actuators for steering, acceleration, or braking via a vehicle ECU 24 to perform driving control of the vehicle.

The driving authorization transfer determination device 1A is connected to an output device 21 inside the vehicle, and can thereby control output of the output device 21. For example, if the output device 21 uses a display device such as a liquid crystal display device, the driving authorization transfer determination device 1A can control display of the display device. Alternatively, if the output device 21 uses an audio output device such as a speaker, the driving authorization transfer determination device 1A can control audio output of the audio output device.

The driving authorization transfer determination device 1A is also connected to an input device 22 inside the vehicle, and can thereby acquire information input to the input device 22. If the output device 21 uses a display device, for example, the input device 22 may use a touch panel formed integrally with the display device, or a touch pad provided separately from the display device. Alternatively, the input device 22 may use a spatial gesture detector that captures a driver with a camera to detect gesture operation of the driver.

The driving authorization transfer determination device 1A includes a task request part 11 that makes the output device 21 output a task request to a driver, a task acquisition part 12 that acquires an accomplishment result of a task of the driver from the input device 22, a transfer determination part 13 that determines whether transfer of driving authorization from the automated driving controller 23 to the driver is acceptable or unacceptable, and a determination result output part 14 that outputs a transfer acceptable/unacceptable determination result to the automated driving controller 23.

Figure 2:
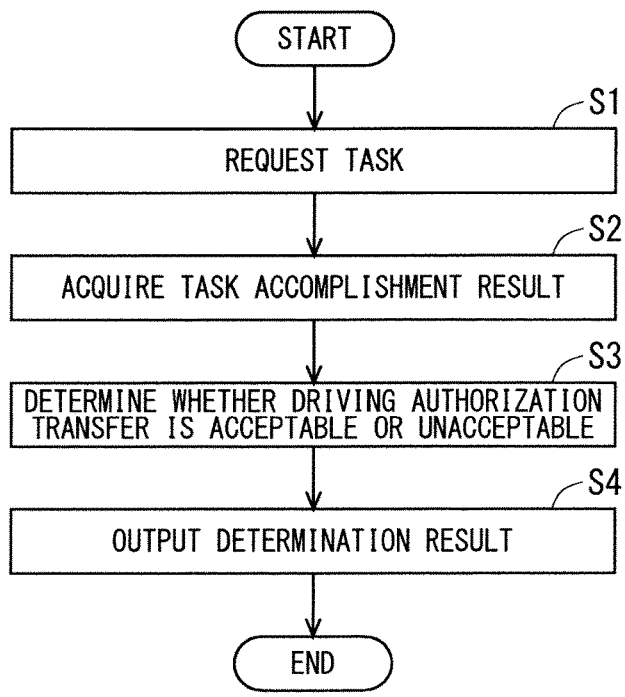
FIG. 2 is a flowchart showing operation of the driving authorization transfer determination device according to the first embodiment.

FIG. 2 is a flowchart showing operation of the driving authorization transfer determination device 1A. Now, operation of the driving authorization transfer determination device 1A is described with reference to FIG. 2. The process shown in FIG. 2 is started when the level of automation of a vehicle is 1 or higher.

First, the task request part 11 makes the output device 21 output a task request (Step S1). In this case, if the output device 21 uses a display device, a message for prompting a driver to input a task is displayed on a display screen of the display device, for example. Alternatively, if the output device 21 uses an audio output device, a voice message for prompting a driver to input a task is output from the audio output device, for example. Examples of the task include continuous speech and body movement for a predetermined period of time.

When the driver receives such a task request and accomplishes the task, the task acquisition part 12 acquires an accomplishment result of the task from the input device 22 (Step S2).

Next, the transfer determination part 13 determines whether transfer of driving authorization is acceptable or unacceptable based on the accomplishment result of the task received by the transfer determination part 13 in Step S2 (Step S3).

Then, the determination result output part 14 outputs a transfer acceptable/unacceptable determination result concerning driving authorization to the automated driving controller 23 (Step S4).

According to the driving authorization transfer determination device 1A of the first embodiment, the task acquisition part 12 acquires an accomplishment result of a task involving continuous speech or body movement for a predetermined period of time from the input device 22 inside the vehicle. Based on the accomplishment result of the task, the transfer determination part 13 determines whether transfer of driving authorization from the automated driving controller 23 to a driver is acceptable or unacceptable. Accordingly, it is possible to determine whether or not the driver is actually prepared for transfer of driving authorization based on the accomplishment result of the task, and then determine whether transfer of driving authorization is acceptable or unacceptable. Moreover, since the task involves continuous speech or body movement for a predetermined period of time, whether or not the driver is prepared for transfer of driving authorization can be accurately determined based on the accomplishment result of the task.

Moreover, since the task involves continuous speech or body movement for a predetermined period of time, whether or not the driver is prepared for transfer of driving authorization can be accurately determined based on the accomplishment result of the task.

Further, according to the driving authorization transfer determination method of the first embodiment, an accomplishment result of a task involving continuous speech or body movement for a predetermined period of time is acquired from the input device 22 inside the vehicle, and then whether transfer is acceptable or unacceptable is determined based on the accomplishment result of the task. Accordingly, it is possible to determine whether or not the driver is actually prepared for transfer of driving authorization based on the accomplishment result of the task, and then determine whether transfer of driving authorization is acceptable or unacceptable. Moreover, since the task involves continuous speech or body movement for a predetermined period of time, whether or not the driver is prepared for transfer of driving authorization can be accurately determined based on the accomplishment result of the task.

Second Embodiment

The block configuration of a driving authorization transfer determination device according to a second embodiment of the present invention is similar to the block configuration of the first embodiment shown in FIG. 1. In the following description, components of the second embodiment that are identical or similar to the components of the first embodiment are thus denoted by the same reference symbols as in the first embodiment. Further, the second embodiment describes an example of transfer of driving authorization when Automation Level 3 is switched to Automation Level 0. However, the present invention can be applied to a case where a level of automation is switched to any lower level of automation.

Figure 3:
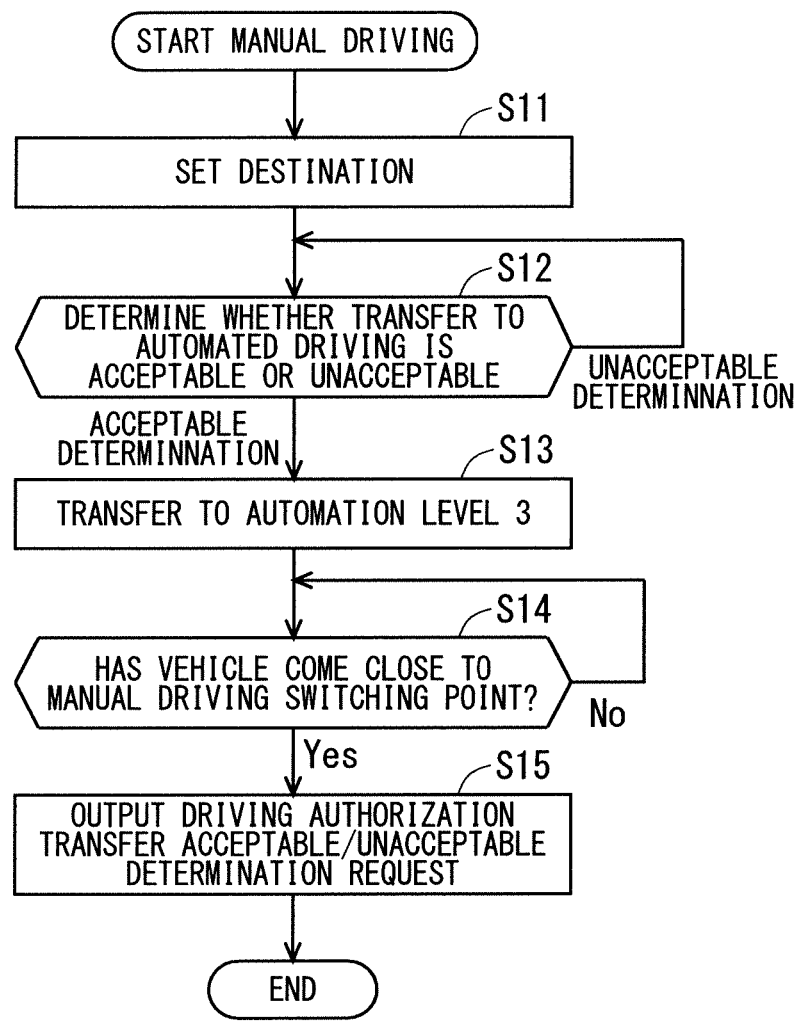
FIG. 3 is a flowchart showing driving authorization transfer acceptable/unacceptable determination request processing of an automated driving controller according to a second embodiment.

The driving authorization transfer determination device 1A of the second embodiment performs driving authorization transfer acceptable/unacceptable determination processing based on a driving authorization transfer acceptable/unacceptable determination request acquired from the automated driving controller 23. Now, driving authorization transfer acceptable/unacceptable determination request processing of the automated driving controller 23 that is performed with respect to the driving authorization transfer determination device 1A is described with reference to the flowchart of FIG. 3.

The automated driving controller 23 sets a destination during manual driving of a vehicle (Step S11). For example, when a user inputs a specific location to the automated driving controller 23, the automated driving controller 23 sets the location as a destination. After setting a destination, the automated driving controller 23 searches for a route from the current vehicle position to the destination, and determines whether or not transfer to automated driving at Automation Level 3 is acceptable (Step S12). Whether transfer of automated driving is acceptable or unacceptable can be determined based on a travelling route of the vehicle, for example. For example, map data stored in the map database 26 contains information about available levels of automation per section, such as information that a certain section in a freeway permits Automation Level 3 or lower while a general road only permits Automation Level 2 or lower. The automated driving controller 23 refers to map data acquired from the map database 26 to determine whether or not the current vehicle position is within a section that permits traveling at Automation Level 3, and determines whether transfer to automated driving at Automation Level 3 is acceptable or unacceptable.

The automated driving controller 23 repeats Step S12 until the automated driving controller 23 determines that transfer to automated driving is acceptable. After determining that transfer to automated driving is acceptable, the automated driving controller 23 transfers the vehicle to automated driving at Automation Level 3 (Step S13).

Next, the automated driving controller 23 refers to the map data to determine whether or not the vehicle has come close to a manual driving switching point on the travelling route (Step S14). The manual driving switching point is a point presented by the map data as a point indicating that only manual driving, i.e., travelling at Automation Level 0, is permitted beyond the point. The automated driving controller 23 intends to switch from automated driving to manual driving at the manual driving switching point unless the driving authorization transfer determination device 1A determines that driving authorization transfer is unacceptable. That is, the manual driving switching point is a point at which transfer of driving authorization is intended. The automated driving controller 23 determines that the vehicle has come close to a manual driving switching point when the distance between the vehicle and the manual driving switching point reaches 2 km or shorter, for example. The automated driving controller 23 repeats Step S14 until the vehicle comes close to the manual driving switching point. After the vehicle comes close to the manual driving switching point, the automated driving controller 23 outputs a driving authorization transfer acceptable/unacceptable determination request to the driving authorization transfer determination device 1A (Step S15). Note that, at this time point, the automated driving controller 23 does not accept driving authorization transfer by default.

As described above, the automated driving controller 23 outputs a driving authorization transfer acceptable/unacceptable determination request before the time point at which the vehicle reaches the manual driving switching point, i.e., the point at which transfer of driving authorization is intended, with enough time margin. Regarding the time margin before outputting a driving authorization transfer acceptable/unacceptable determination request, the description above mentions a time point at which the distance between a vehicle and a manual driving switching point reaches 2 km or shorter. However, the distance may be appropriately adjusted depending upon the road shape of a travelling route, traffic conditions, etc.

Next, driving authorization transfer acceptable/unacceptable determination processing of the driving authorization transfer determination device 1A is described with reference to the flowchart of FIG. 4.

First, the task request part 11 of the driving authorization transfer determination device 1A receives a driving authorization transfer acceptable/unacceptable determination request from the automated driving controller 23 during automated driving of a vehicle (Step S21), and then makes the output device 21 output a task request (Step S22).

Then, the transfer determination part 13 determines whether transfer of driving authorization is acceptable or unacceptable (Step S23). Specifically, if the task acquisition part 12 does not acquire a task accomplishment result within a predetermined period of time Tth from the task request of Step S22, the transfer determination part 13 determines that driving authorization transfer is unacceptable. Examples of this case include a case where a driver does not notice a task request because the driver is sleeping, reading, operating a portable device, etc., and a case where a driver does not have a free hand due to eating, drinking, etc. to be unable to accomplish a task even though the driver notices a task request. In such cases, the transfer determination part 13 determines that driving authorization transfer is unacceptable. This can forestall transfer of driving authorization to a driver when the driver is not prepared for transfer of driving authorization.

Alternatively, if the task acquisition part 12 acquires a task accomplishment result within the predetermined period of time Tth from the task request of Step S22, the transfer determination part 13 determines whether transfer of driving authorization is acceptable or unacceptable based on the task accomplishment result. Details of such transfer acceptable/unacceptable determination based on a task accomplishment result will be described later.

When the transfer determination part 13 determines that the driving authorization transfer is acceptable, the determination result output part 14 notifies the automated driving controller 23 of the determination result (Step S24). Alternatively, when the transfer determination part 13 determines that the driving authorization transfer is unacceptable, the determination result output part 14 notifies the automated driving controller 23 of the determination result (Step S25).

Next, specific examples of tasks and driving authorization transfer acceptable/unacceptable determination are described in an example where the output device 21 is a display device.

Figure 4:
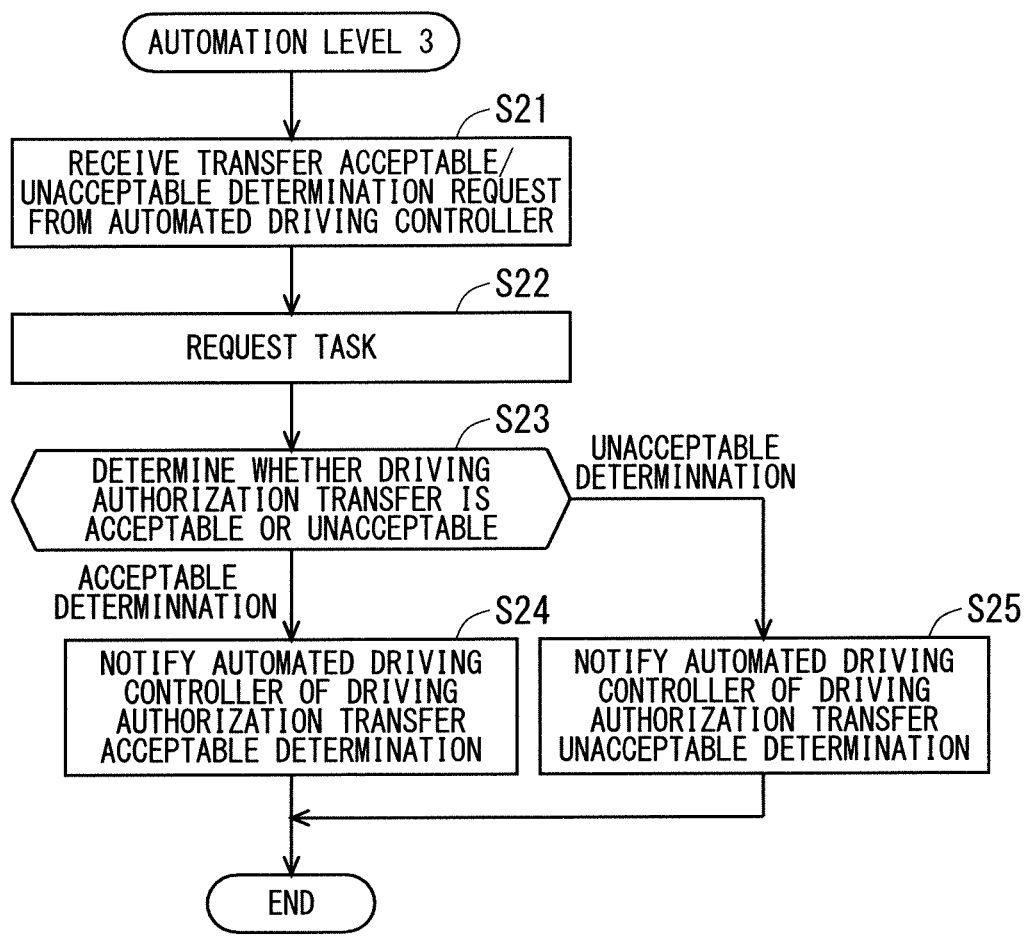
FIG. 4 is a flowchart showing driving authorization transfer acceptable/unacceptable determination processing of a driving authorization transfer determination device according to the second embodiment.
Figure 5:
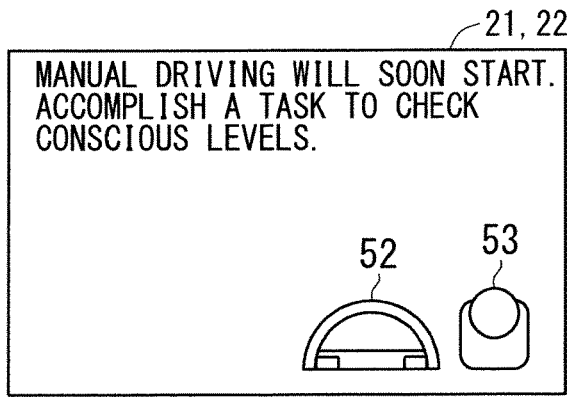
FIG. 5 is a diagram showing an example of a task request screen.

FIG. 5 shows one example of a task request screen that is displayed by the task request part 11 on a display device as the output device 21 in Step S22 of FIG. 4. The task request screen of FIG. 5 displays a message of "Manual driving will soon start. Accomplish a task to check conscious levels." as well as icons 52 and 53 of the input device 22 that are available to be used in task operation as reference. The icon 52 is an icon representing a touch pad mounted on a steering wheel, and the icon 53 is an icon representing a joystick mounted near a shift knob. The touch pad and the joystick are examples of the input device 22.

Subsequently to displaying the task request screen, the task request part 11 displays a task accomplishment screen on the display device. FIG. 6 to FIG. 9 show examples of task accomplishment screens involving movement of a finger. Note that, FIG. 6 to FIG. 9 exemplify a case where the output device 21 and the input device 22 are integrally formed as a touch panel, and a task is accomplished by gesture operation on the touch panel.

Figure 6:
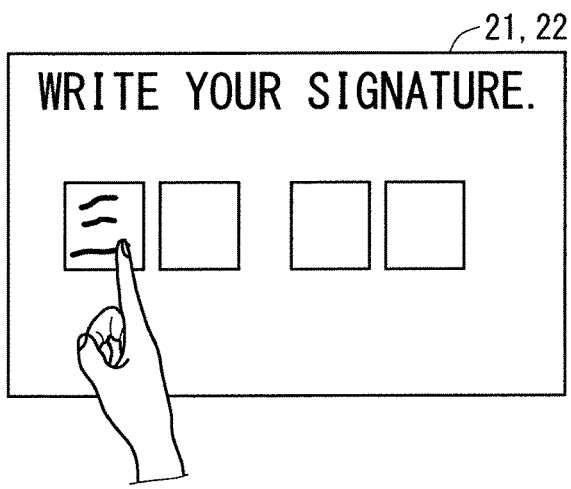
FIG. 6 is a diagram showing an example of a task accomplishment screen.

FIG. 6 shows an accomplishment screen for a task of writing a signature. The accomplishment screen of this task displays a message of "Write your signature." as well as a signature writing form. The driver touches the touch panel to write his/her own name in the signature writing form, thereby accomplishing the task. The track of a finger of the driver on the touch panel (hereinafter referred to as an accomplishment track) is input from the touch panel to the task acquisition part 12 as an accomplishment result of the task.

The transfer determination part 13 compares the accomplishment track, which is a track acquired by the task acquisition part 12, with a track that is predetermined to be an ideal track, and thereby determines whether transfer is acceptable or unacceptable. For example, the driver is asked to write his/her signature using the touch panel when the driver is subjected to a little driving load such as when the vehicle is stopping, at which time the ideal track is preregistered in the driving authorization transfer determination device 1A. The transfer determination part 13 measures a deviation amount Cm of the accomplishment track with respect to the ideal track, and then compares the deviation amount Cm with a predetermined threshold Cth. Subsequently, the transfer determination part 13 determines that transfer is unacceptable if Cm≥Cth, and determines that transfer is acceptable if Cm<Cth. For example, it is conceivable that if the driver is not fully awake, the driver may write a wrong letter, or the track may be trembling even if the driver writes a correct letter. In such cases, the deviation amount Cm of the accomplishment track with respect to the ideal track increases, and thus the transfer determination part 13 determines that driving authorization transfer is unacceptable. This can forestall transfer of driving authorization to a driver when the driver is not prepared for transfer of driving authorization.

Figure 7:
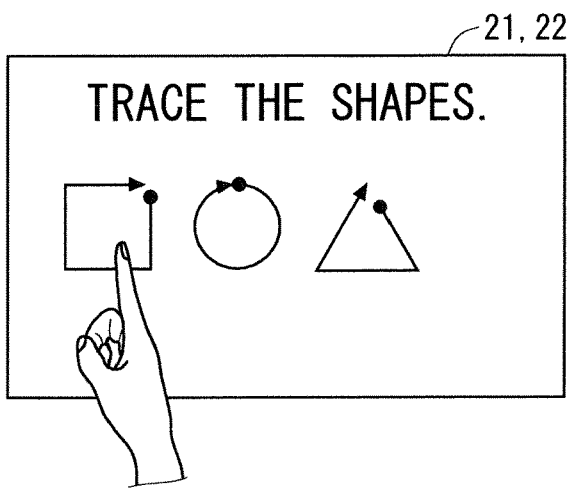
FIG. 7 is a diagram showing an example of a task accomplishment screen.

FIG. 7 shows an accomplishment screen for a task of tracing shapes. The accomplishment screen of this task displays a message of "Trace the shapes." as well as a square, a circle, and a triangle that need to be traced. The driver traces these shapes with a finger touching the touch panel, thereby accomplishing the task. An ideal track of this task is a track obtained when the shapes are exactly traced. Similarly to the task of FIG. 6, the transfer determination part 13 compares an accomplishment track with an ideal track, and then determines whether transfer is acceptable or unacceptable based on a deviation amount Cm of the accomplishment track with respect to the ideal track.

Further, the transfer determination part 13 may define change in speed of an accomplishment track as smoothness, and may determine whether transfer is acceptable or unacceptable based on smoothness of the accomplishment track. For example, the transfer determination part 13 determines that transfer is acceptable if change in speed of an accomplishment track is small, and determines that transfer is unacceptable if change in speed of an accomplishment track is large. Alternatively, the transfer determination part 13 may combine the above-mentioned determination based on deviation with respect to an ideal track with the determination based on smoothness.

Figure 8:
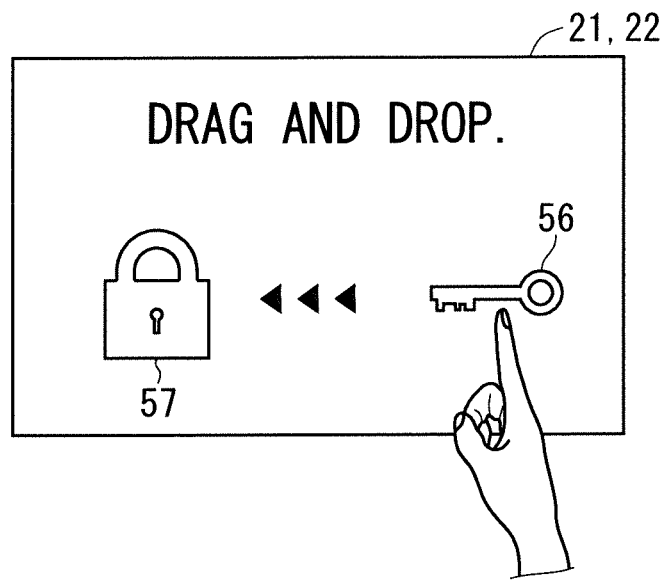
FIG. 8 is a diagram showing an example of a task accomplishment screen.

FIG. 8 shows an accomplishment screen for a task of dragging and dropping. The accomplishment screen of this task displays a message of "Drag and drop." as well as a key icon 56 and a keyhole icon 57. The driver touches the key icon 56 on the touch panel, drags the key icon 56 over the keyhole icon 57, and then drops the key icon 56 at the position. In this manner, the driver accomplishes the task of inserting the key icon 56 into the keyhole icon 57. The transfer determination part 13 determines whether transfer is acceptable or unacceptable based on accuracy of the dropping position of the key icon 56. For example, the transfer determination part 13 measures the distance between the dropping position of the key icon 56 and the keyhole icon 57, and then determines that transfer is unacceptable if the distance is equal to or larger than a predetermined threshold.

Figure 9:
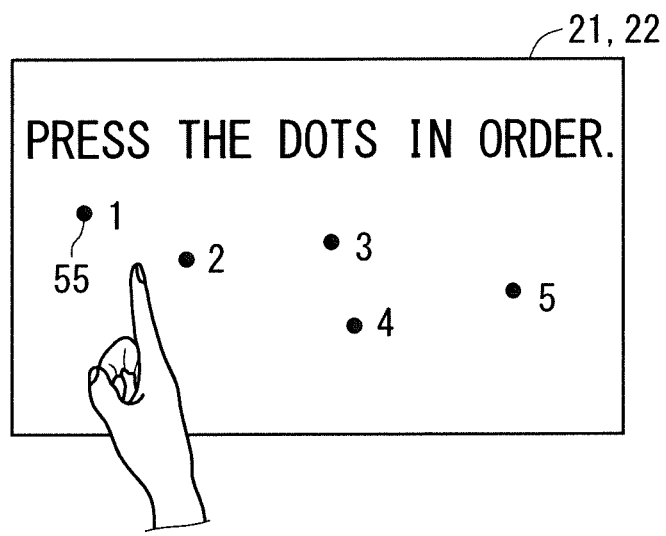
FIG. 9 is a diagram showing an example of a task accomplishment screen.

FIG. 9 shows an accomplishment screen for a task of touching a plurality of dots in order. The accomplishment screen of this task displays a message of "Press the dots in order." as well as five dots 55. The dots 55 are respectively denoted by the numbers of 1, 2, 3, 4, and 5, and the driver accomplishes the task of touching the dots on the touch panel in numerical order. The transfer determination part 13 determines whether transfer is acceptable or unacceptable based on accuracy and speed of touching the dots 55. For example, the transfer determination part 13 determines that transfer is unacceptable if the driver touches the dots 55 in wrong order. Alternatively, the transfer determination part 13 determines that transfer is unacceptable if a period of time from when the accomplishment screen of the task is displayed until the driver touches all of the dots 55 takes more than a predetermined period of time. Note that, the positions of the dots 55 may be changed from those of the last task, or the order in which the dots 55 need to be touched may be changed every time the task is accomplished. With this, the driver can be less accustomed to the task.

Figure 10:
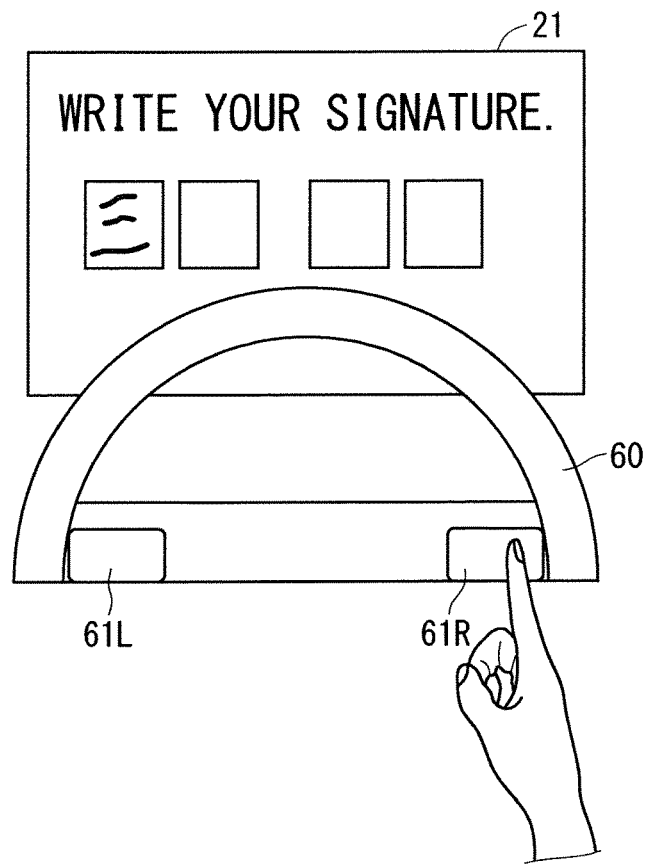
FIG. 10 is a diagram showing how a task is accomplished by using a touch pad.
Figure 11:
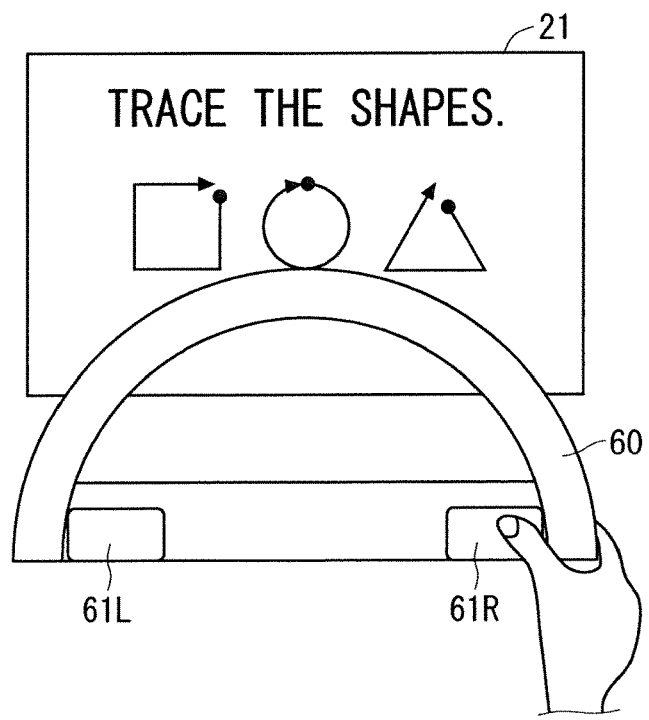
FIG. 11 is a diagram showing how a task is accomplished by using a touch pad.
Figure 12:
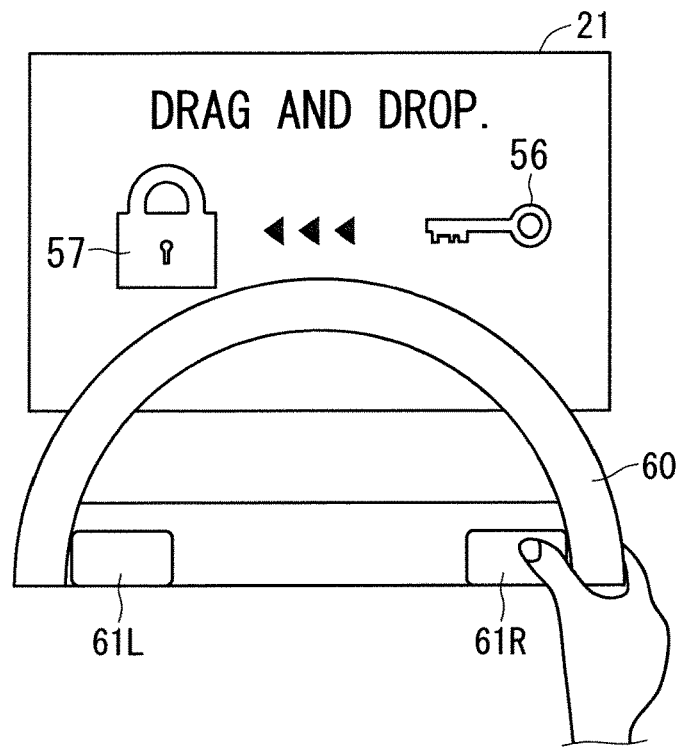
FIG. 12 is a diagram showing how a task is accomplished by using a touch pad.

In FIG. 6 to FIG. 9, the input device 22 uses a touch panel as an example. However, the input device 22 may use a device other than a touch panel. FIG. 10 to FIG. 13 show how the tasks described in FIG. 6 to FIG. 8 are accomplished by using a pair of touch pads 61R and 61L that are mounted on a steering wheel 60 correspondingly to the right hand and the left hand. As shown in FIG. 10, for example, the driver touches the right touch pad 61R with an index finger, and moves the touching finger to thereby input his/her signature. Alternatively, as shown in FIG. 11 and FIG. 12, the driver touches the right touch pad 61R with a thumb while holding the steering wheel, and moves the touching thumb to thereby trace shapes or perform dragging and dropping.

Figure 13:
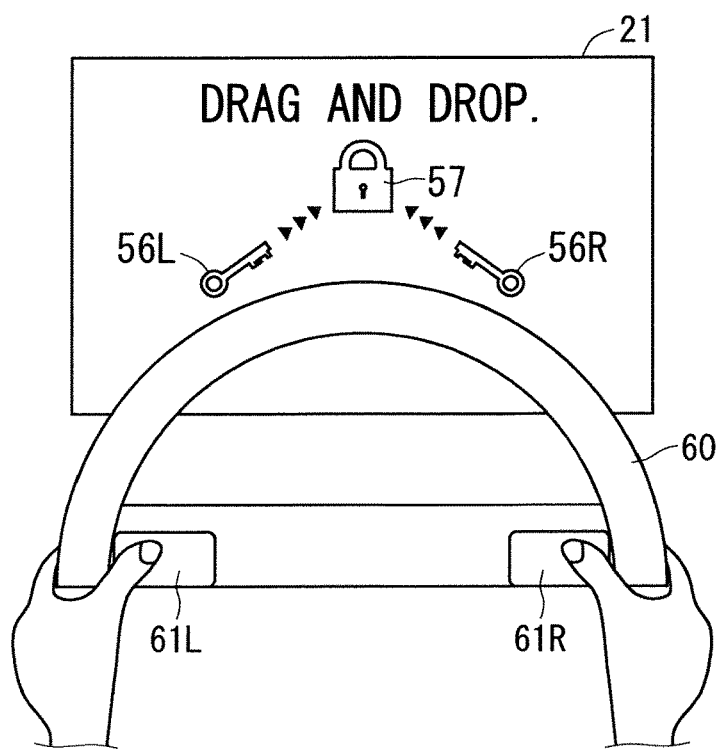
FIG. 13 is a diagram showing how a task is accomplished by using a touch pad.

FIG. 13 shows how the task of dragging and dropping is accomplished by simultaneously using the right touch pad 61R and the left touch pad 61L. The driver operates the right touch pad 61R with a thumb while holding the steering wheel 60 to thereby drag a key icon 56R and insert the key icon 56R into a keyhole icon 57, and simultaneously, the driver operates the left touch pad 61L with another thumb to thereby drag a key icon 56L and insert the key icon 56L into the keyhole icon 57.

In FIG. 6 to FIG. 13, the display device on which the task request screen and the task accomplishment screen are displayed may be a center display, a meter display, or a head-up display (HUD) of a vehicle.

In the above description, the input device 22 includes an operation surface such as a touch panel or a touch pad, and the task acquisition part 12 acquires an accomplishment result of a task based on contact information of a finger of a driver on the operation surface. However, the input device 22 may be a device that detects non-contact gesture operation, i.e., the track of body movement of a driver in an operation space inside the vehicle. In this case, the input device 22 uses a camera for capturing behavior of a driver inside the vehicle. For example, behavior in which a driver moves a first is recognized as drag operation, and movement of opening the first is recognized as drop operation.

Figure 14:
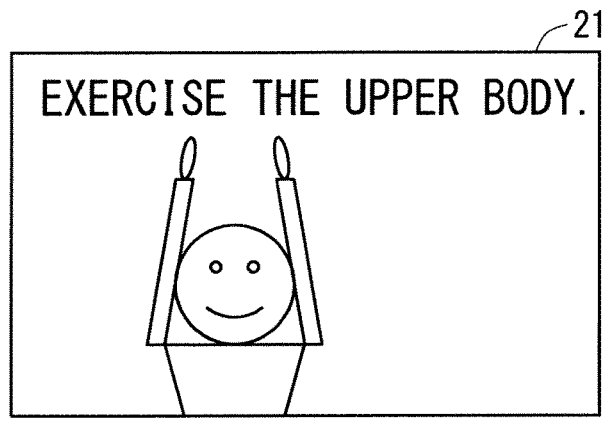
FIG. 14 is a diagram showing an example of a task accomplishment screen.

FIG. 14 shows an example of an accomplishment screen of a task involving non-contact gesture operation. The accomplishment screen of this task displays a message of "Exercise the upper body." as well as an animation of an exercising person. When the driver does similar exercise according to the animation, such behavior of the driver is captured by a camera, and the captured image is input to the task acquisition part 12. The task acquisition part 12 acquires the track of each part of the upper body of the driver from the image captured by the camera as an accomplishment track. Then, the transfer determination part 13 measures a deviation amount Cm of the accomplishment track with respect to an ideal track, and then compares the deviation amount Cm with a predetermined threshold Cth. Subsequently, the transfer determination part 13 determines that transfer is acceptable if Cm<Cth, and determines that transfer is unacceptable if Cm≥Cth.

In the above description, tasks involve continuous movement of a finger or the upper body for a predetermined period of time. However, tasks may involve movement of gaze or the focal length of the eye. In this case, the output device 21 uses a HUD, and the input device 22 uses a camera for capturing the face of the driver.

Figure 15:
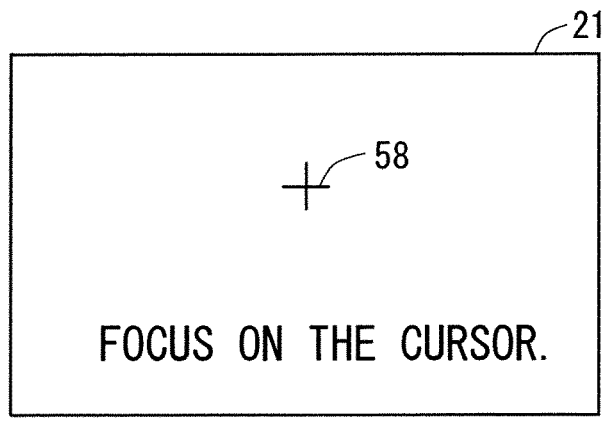
FIG. 15 is a diagram showing an example of a task accomplishment screen.

FIG. 15 shows an accomplishment screen for a task of moving the focal length of the eye. The accomplishment screen of this task is displayed on a HUD, for example, and the input device 22 uses a camera for capturing the face of the driver. Further, the accomplishment screen of this task displays a message of "Focus on the cursor." as well as a cursor 58. The position of the cursor 58 on the display screen is fixed, but the image forming position of the cursor 58 is changed through time in a direction perpendicular to the display screen. The driver accomplishes the task of focusing on the cursor 58 continuously for a predetermined period of time. The task acquisition part 12 acquires an image of the face of the driver captured by a camera, and then measures the focal length of the eye based on the pupillary distance between both eyes of the driver. The transfer determination part 13 compares the focal length of the eye of the driver during the task accomplishment with the image forming position of the cursor 58, and calculates a deviation amount Cm therebetween. Subsequently, the transfer determination part 13 compares the deviation amount Cm with a predetermined threshold Cth, and then determines that transfer is acceptable if Cm<Cth, and determines that transfer is unacceptable if Cm≥Cth.

Figure 16:
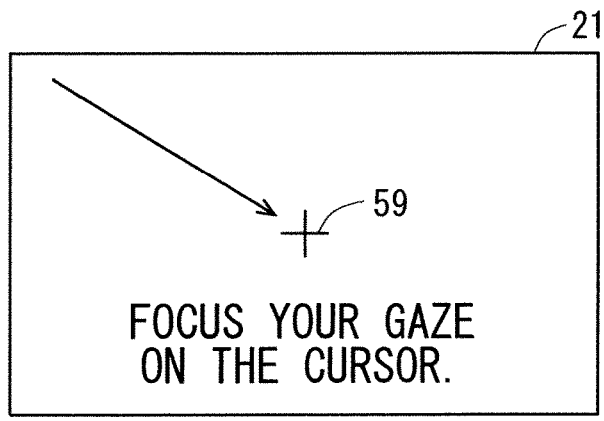
FIG. 16 is a diagram showing an example of a task accomplishment screen.

FIG. 16 shows an accomplishment screen for a task of moving a gaze direction. The accomplishment screen of this task is displayed on a HUD, for example, and the input device 22 uses a camera for capturing the face of the driver. Further, the accomplishment screen of this task displays a message of "Focus your gaze on the cursor." as well as a cursor 59. The image forming position of the cursor 59 in a direction perpendicular to the display screen is fixed, but the cursor 59 moves on the display screen from the top left corner toward the center. The driver accomplishes the task of focusing his/her gaze on the cursor 59 continuously for a predetermined period of time. The task acquisition part 12 acquires an image of the face of the driver captured by a camera, and then measures a gaze direction based on the captured image. The transfer determination part 13 compares the gaze direction of the driver with the position of the cursor 59, and calculates a deviation amount Cm therebetween. Subsequently, the transfer determination part 13 compares the deviation amount Cm with a predetermined threshold Cth, and then determines that transfer is acceptable if Cm<Cth, and determines that transfer is unacceptable if Cm≥Cth.

Note that, only the image forming position of the cursor 58 in a direction perpendicular to the display screen is moved in FIG. 15, whereas only the position of the cursor 59 on the display screen is moved in FIG. 16. However, both the positions may be simultaneously moved to make the driver accomplish a task of moving a gaze direction and moving the focal length simultaneously.

In the above description, tasks involve movement of the body of the driver, such as a finger, the upper body, and the eyes. However, tasks may involve speech. In this case, the output device 21 uses an audio output device such as a speaker, and the input device 22 uses a speech recognition device. For example, the task request part 11 makes the audio output device output a voice question such as "Say your name." The voice question made to be output by the task request part 11 as a task as in the above and an answer to the question are preregistered in the driving authorization transfer determination device 1A. When the driver says his/her name, the speaking voice of the driver is recognized by the speech recognition device, and then a recognition result is input from the speech recognition device to the task acquisition part 12. The transfer determination part 13 compares the recognition result of the speaking voice of the driver with the registered answer, and then determines that transfer is acceptable if the recognition result and the answer match, and determines that transfer is unacceptable if the recognition result and the answer do not match. That is, the transfer determination part 13 determines whether transfer is acceptable or unacceptable based on accuracy of the speech of the driver. Alternatively, the transfer determination part 13 may determine whether transfer is acceptable or unacceptable based on presence, absence, or degree of volume and intonation, a response period of time from a question to an answer, etc.

Alternatively, instead of the questioning and answering style, the driver may be requested to read a previously prepared sentence that is displayed on the display device. Whether transfer is acceptable or unacceptable may be determined from the viewpoints of intonation and volume of the reading voice, whether the sentence is read without mistakes, and whether the articulation is clear.

Specific examples of various tasks and a transfer acceptable/unacceptable determination method in each task have been described in the above. Note that, the driving authorization transfer determination device 1A may make the driver accomplish a plurality of the above-mentioned tasks to determine whether transfer is acceptable or unacceptable based on the accomplishment results of the plurality of tasks, or may combine a plurality of transfer acceptable/unacceptable determination methods in each task.

If acquiring driving authorization transfer acceptable determination from the driving authorization transfer determination device 1A, the automated driving controller 23 switches to manual driving when the vehicle reaches a manual driving switching point. However, if acquiring driving authorization transfer unacceptable determination from the driving authorization transfer determination device 1A, the automated driving controller 23 does not switch to manual driving.

Figure 17:
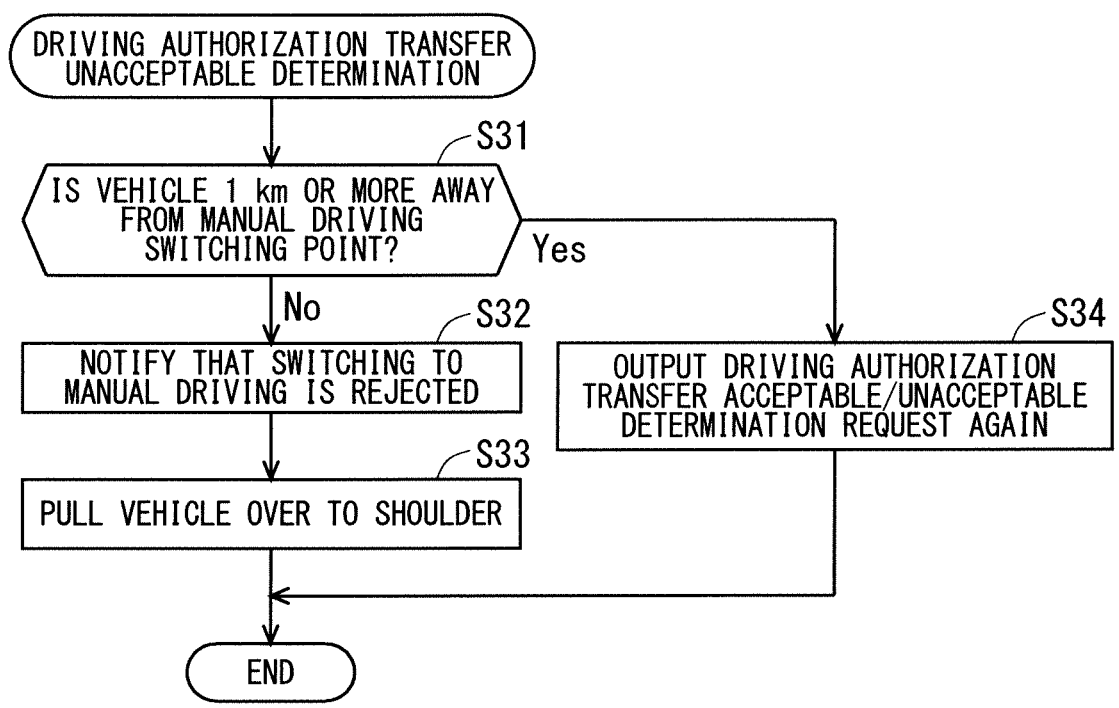
FIG. 17 is a flowchart showing operation of the automated driving controller after acquiring driving authorization transfer unacceptable determination.

FIG. 17 is a flowchart showing operation of the automated driving controller 23 after acquiring driving authorization transfer unacceptable determination from the driving authorization transfer determination device 1A. First, the automated driving controller 23 determines whether or not the current vehicle position is 1 km or more away from a manual driving switching point (Step S31). Note that, the threshold of the distance of 1 km is one example, and may be set depending on the traveling speed of the vehicle, the road condition of a travelling route, the condition of traffic congestion, etc. in consideration of a distance traveled by the vehicle while the driving authorization transfer determination device 1A again determines whether transfer is acceptable.

If the current vehicle position is 1 km or more away from a manual driving switching point, the automated driving controller 23 outputs a driving authorization transfer acceptable/unacceptable determination request again to the driving authorization transfer determination device 1A (Step S34). Then, the driving authorization transfer determination device 1A again requests the driver to accomplish a task, determines whether transfer of driving authorization is acceptable or unacceptable based on an accomplishment result of the task, and outputs the accomplishment result to the automated driving controller 23.

If the current vehicle position is not 1 km or more away from a manual driving switching point, the automated driving controller 23 makes the output device 21 notify that switching to manual driving is rejected (Step S32). Then, the automated driving controller 23 pulls the vehicle over to the shoulder (Step S33). In this manner, the automated driving controller 23 stops the vehicle before passing a manual driving switching point. This can forestall transfer to manual driving when the driver is not prepared for transfer of driving authorization.

Third Embodiment

Figure 18:
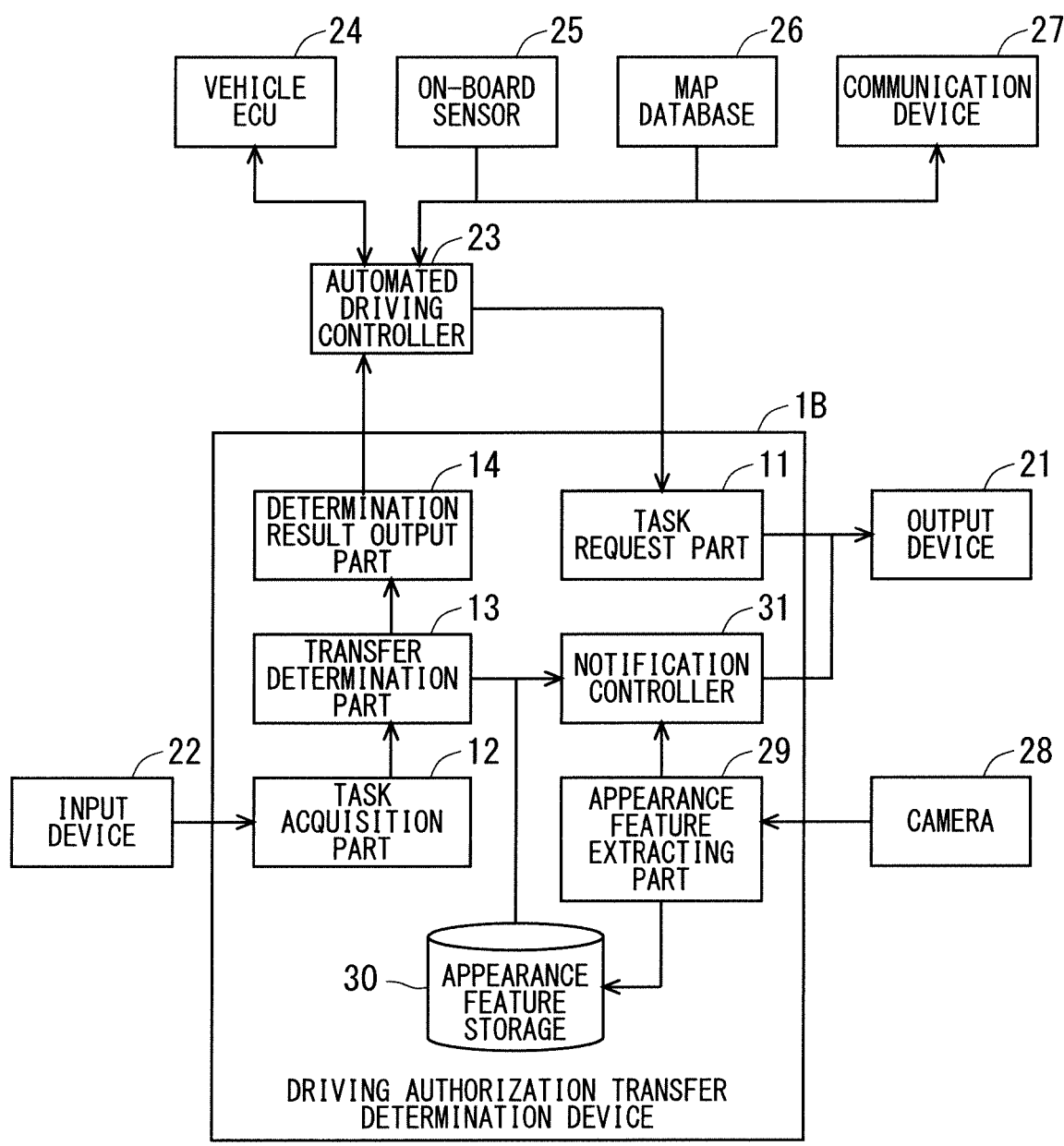
FIG. 18 is a block diagram showing a configuration of a driving authorization transfer determination device according to a third embodiment.

FIG. 18 is a block diagram showing a configuration of a driving authorization transfer determination device 1B according to a third embodiment. The driving authorization transfer determination device 1B includes an appearance feature extracting part 29, an appearance feature storage 30, and a notification controller 31 in addition to the components of the driving authorization transfer determination device 1A according to the second embodiment.

The appearance feature extracting part 29 acquires a captured image of a driver from a camera 28 that is mounted in a vehicle, and then extracts appearance features of the driver from the captured image. For example, before the levels of automation of a vehicle are switched, the appearance feature extracting part 29 extracts appearance features of the driver at that time point. Examples of appearance features include features in appearance of a driver, such as whether or not the driver wears glasses. The appearance features extracted by the appearance feature extracting part 29 are associated with the level of automation of the vehicle when the appearance features are extracted, and are stored in the appearance feature storage 30. In FIG. 18, the appearance feature storage 30 is illustrated inside the driving authorization transfer determination device 1B, but the appearance feature storage 30 may be configured in a server outside the driving authorization transfer determination device 1B.

The notification controller 31 makes the output device 21 notify the driver based on the appearance features extracted by the appearance feature extracting part 29.

Figure 19:
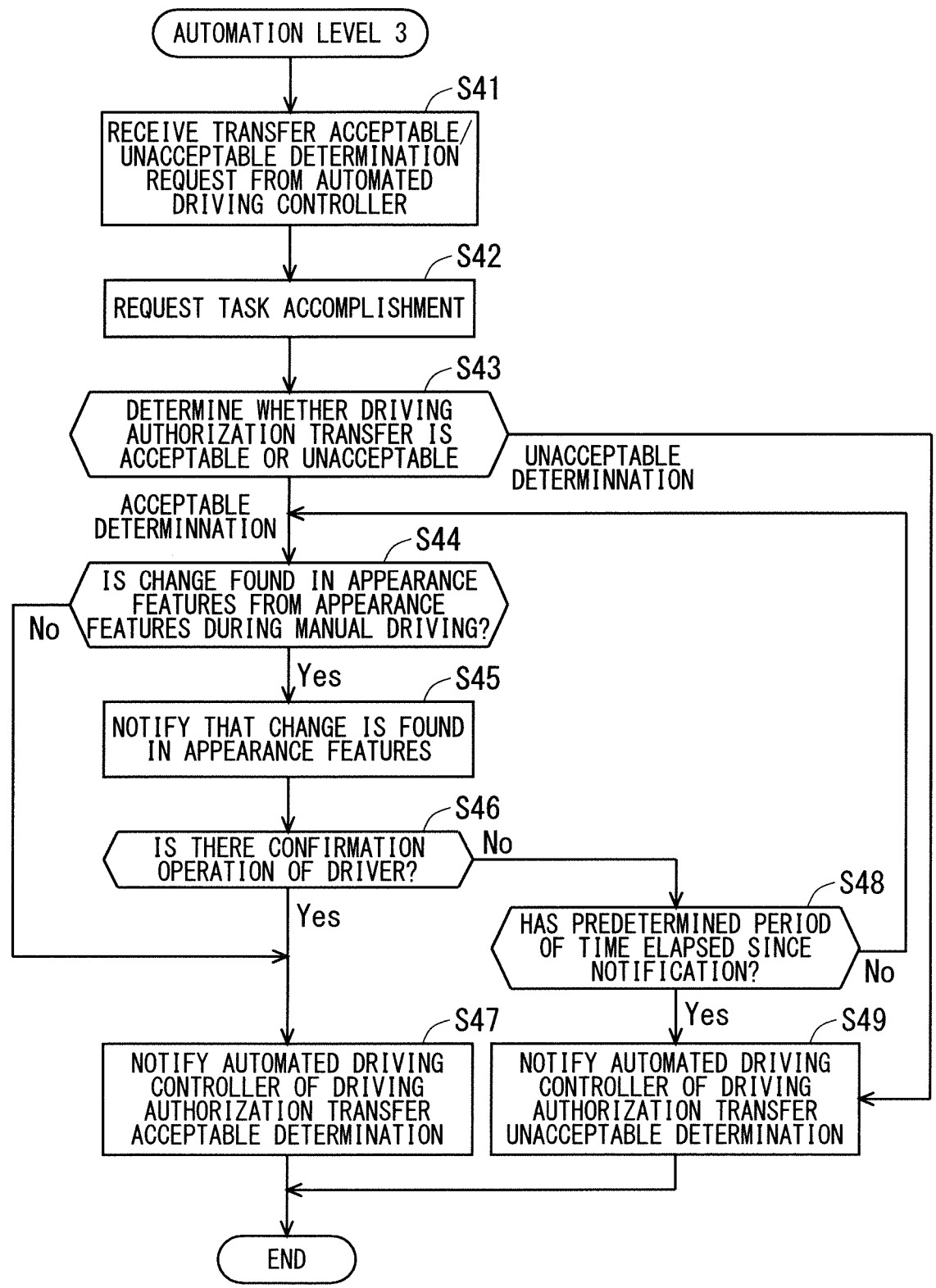
FIG. 19 is a flowchart showing driving authorization transfer acceptable/unacceptable determination processing of the driving authorization transfer determination device according to the third embodiment.

Now, driving authorization transfer acceptable/unacceptable determination processing of the driving authorization transfer determination device 1B is described with reference to the flowchart of FIG. 19. Note that, FIG. 19 describes an example of driving authorization transfer from automated driving at Automation Level 3 to manual driving. However, the present invention can be applied to a case where a level of automation is switched to any lower level of automation. Steps S41, S42, S43, and S49 of FIG. 19 are similar to Steps S21, S22, S23, and S25 of the second embodiment shown in FIG. 4, and thus description thereof is omitted.

When the transfer determination part 13 determines that driving authorization transfer is acceptable in Step S43, the notification controller 31 compares appearance features of the current driver with appearance features of the driver of the time after driving authorization was previously transferred to the current driving authorization, that is, appearance features of the driver during the previous manual driving, and then determines whether change is found between both the appearance features (Step S44). In this step, the notification controller 31 acquires the current appearance features of the driver from the appearance feature extracting part 29, acquires appearance features of the driver during the previous manual driving from the appearance feature storage 30, and then compares both the appearance features. Note that, if the appearance feature storage 30 stores a plurality of appearance features during manual driving, the notification controller 31 may acquire the latest appearance features, or may acquire the most frequent appearance features, for example.

If no change is found in appearance features in Step S44, the notification controller 31 does not perform any notification control, and thus the determination result output part 14 notifies the automated driving controller 23 of driving authorization transfer acceptable determination (Step S47).

Figure 20:
FIG. 20 is a diagram showing an example of a notification screen indicating that change is found in appearance features.

On the other hand, if change is found in appearance features in Step S44, the notification controller 31 makes the output device 21 notify that change is found in appearance features (Step S45). FIG. 20 shows an example of a notification screen displayed by a display device in Step S45 when the output device 21 is a display device and the input device 22 is a touch panel formed integrally with the display device. As one example, the current appearance features of the driver are "not wearing glasses," while appearance features of the driver during the previous manual driving are "wearing glasses." In this case, as shown in FIG. 20, the notification screen displays a message of "Do you not need to wear glasses?" as well as a confirm icon 62, thereby prompting the driver to wear glasses.

The driver can perform confirmation operation of the notification by touching the confirm icon 62. Alternatively, if the input device 22 uses a speech recognition device, the driver can also perform confirmation operation with voice by saying "Confirmed." When the driving authorization transfer determination device 1B acquires such confirmation operation of the driver, the determination result output part 14 notifies the automated driving controller 23 of driving authorization transfer acceptable determination (Step S47).

On the other hand, if the driver does not perform confirmation operation in Step S46, the driving authorization transfer determination device 1B determines whether or not a predetermined period of time has elapsed since the notification of Step S45 (Step S48). If the predetermined period of time has not elapsed yet, the process returns to Step S44, and the notification controller 31 determines whether change is found between appearance features of the driver during the previous manual driving and the current driver. Then, if no change is found between appearance features of the driver during the previous manual driving and the current driver, the determination result output part 14 notifies the automated driving controller 23 of driving authorization transfer acceptable determination (Step S47). In this manner, when the driver wears glasses without performing confirmation operation, the driving authorization transfer determination device 1B can detect correction to the change in appearance features before determining whether driving authorization transfer is acceptable.

If a predetermined period of time has elapsed since the notification of Step S45 without confirmation operation of the driver, the determination result output part 14 notifies the automated driving controller 23 of driving authorization transfer unacceptable determination (Step S49). In this manner, if the driver does not make any response to the notification about the change in appearance features and the change is not corrected, transfer to manual driving is restricted.

According to the above processing, if features exhibited in appearance of the driver during the previous manual driving are not exhibited in appearance of the driver at the time of transfer to the current manual driving, the driver is notified of such change. This enables smooth transfer from automated driving to manual driving. For example, if a driver who usually wears glasses during manual driving does not wear glasses at the time of switching to manual driving, the driver can put on glasses before switching to manual driving because the driving authorization transfer determination device 1B notifies the driver of not wearing glasses. Further, even if the driver does not have glasses at hand, the driver can be prepared for manual driving knowing that the driver does not wear glasses.

In the above example, simply whether or not glasses are worn is employed as appearance features. However, the appearance feature extracting part 29 may distinguish individual pairs of glasses based on the color, size, and shape of the glasses, for example. With this, if a driver wears a pair of glasses different from the usual pair of glasses at the time of transfer to manual driving, the driving authorization transfer determination device 1B can notify the driver of the difference to prompt the driver to wear a pair of glasses for driving.

<Hardware Configuration>

Figure 21:
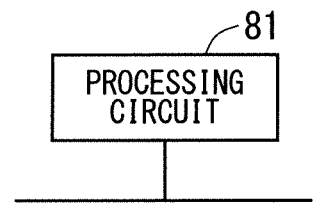
FIG. 21 is a diagram showing a hardware configuration of the driving authorization transfer determination device.

The task request part 11, the task acquisition part 12, the transfer determination part 13, and the determination result output part 14 (hereinafter referred to as "the task request part 11 etc.") of the above-mentioned driving authorization transfer determination devices 1A and 1B are implemented by a processing circuit 81 shown in FIG. 21. That is, the processing circuit 81 includes the task request part 11 that makes an output device inside a vehicle output a request for a task involving continuous speech or body movement for a predetermined period of time, the task acquisition part 12 that acquires an accomplishment result of the task from an input device inside the vehicle, the transfer determination part 13 that determines whether the transfer is acceptable or unacceptable based on the accomplishment result of the task, and the determination result output part 14 that outputs a determination result of the transfer determination part to an automated driving controller. The processing circuit 81 may use dedicated hardware, or may use a processor to execute a program stored in memory. The processor is, for example, a central processing unit, a processing unit, an arithmetic unit, a microprocessor, a microcomputer, or a digital signal processor.

If the processing circuit 81 is dedicated hardware, the processing circuit 81 is, for example, a single circuit, a composite circuit, a programmed processor, a program for a parallel program, an application specific integrated circuit (ASIC), a field-programmable gate array (FPGA), or a combination of these. The function of each part of the task request part 11 etc. may be implemented by a plurality of processing circuits 81, or the functions of individual parts may be collectively implemented by one processing circuit.

Figure 22:
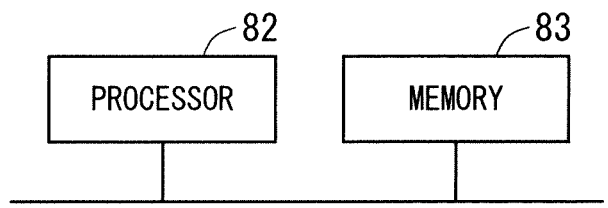
FIG. 22 is a diagram showing a hardware configuration of the driving authorization transfer determination device.

If the processing circuit 81 is a processor, the functions of the task request part 11 etc. are implemented by a combination with software or the like (software, firmware, or software and firmware). Software or the like is described as a program, and is stored in memory. As shown in FIG. 22, a processor 82 used in the processing circuit 81 reads out and executes a program stored in memory 83, thereby implementing the function of each part. That is, the driving authorization transfer determination devices 1A and 1B include the memory 83 for storing a program that eventually execute, when the program is executed by the processing circuit 81, a step of making an output device inside a vehicle output a request for a task involving continuous speech or body movement for a predetermined period of time, a step of acquiring an accomplishment result of the task from an input device inside the vehicle, a step of determining whether the transfer is acceptable or unacceptable based on the accomplishment result of the task, and a step of outputting a determination result as to whether the transfer is acceptable or unacceptable to an automated driving controller. In other words, it can be said that the program makes a computer execute a procedure and a method of the task request part 11 etc. In this case, for example, the memory 83 includes at least any one of a non-volatile or volatile semiconductor memory such as random access memory (RAM), read only memory (ROM), flash memory, electrically programmable read only memory (EPROM), and electrically erasable programmable read only memory (EEPROM), a hard disk drive (HDD), a magnetic disk, an optical disc, a compact disc, a MiniDisc, a digital versatile disk (DVD), and a drive device thereof.

In the above, configuration in which the functions of the task request part 11 etc. are implemented by any one of hardware and software or the like is described. However, the configuration is not limited thereto, and configuration in which a part of the task request part 11 etc. is implemented by dedicated hardware and another part is implemented by software or the like may be adopted. For example, the function of the task request part 11 may be implemented by a processing circuit as dedicated hardware, and the functions of the other parts may be implemented by the processing circuit 81 as the processor 82 reading out and executing a program stored in the memory 83.

In this manner, the processing circuit may implement the above-mentioned individual functions by hardware, software or the like, or a combination of these. Note that, the appearance feature storage 30 is configured by the memory 83, and those may be configured by one type of memory 83, or each of those may be configured by an individual type of memory.

Further, the driving authorization transfer determination devices 1A and 1B described above may be configured only by an on-board device, or may also be applied to a system constructed by appropriately combining an on-board device, a portable navigation device, a communication terminal (e.g., a portable terminal such as a portable phone, a smartphone, and a tablet), the function of an application installed in these, a server, etc. In this case, the functions and the components of the driving authorization transfer determination devices 1A and 1B described above may be distributed in devices that construct the system, or may be centralized in any of the devices.

Figure 23:
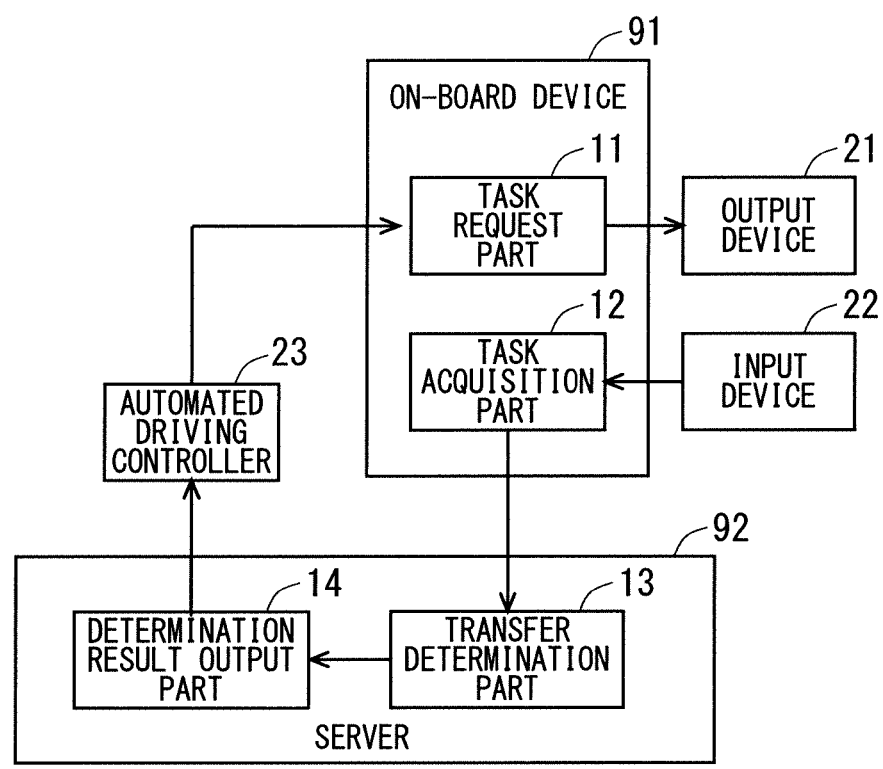
FIG. 23 is a block diagram showing an example of a configuration of the driving authorization transfer determination device configured by an on-board device and a server.

As one example, FIG. 23 shows a configuration example of the driving authorization transfer determination device 1A configured by an on-board device 91 and a server 92. As shown in FIG. 23, the task request part 11 and the task acquisition part 12 are configured by the on-board device 91, and the transfer determination part 13 and the determination result output part 14 are configured by the server 92.

Note that, in the present invention, each of the embodiments may be freely combined, and each of the embodiments may be modified or omitted as appropriate within the scope of the invention.

While the invention has been shown and described in detail, the foregoing description is in all aspects illustrative and not restrictive. It is therefore understood that numerous unillustrated modifications can be devised without departing from the scope of the invention.

EXPLANATION OF REFERENCE SIGNS 1A, 1B driving authorization transfer determination device, 11 task request part, 12 task acquisition part, 13 transfer determination part, 14 determination result output part, 21 output device, 22 input device, 23 automated driving controller, 24 vehicle ECU, 25 on-board sensor, 26 map database, 27 communication device, 29 appearance feature extracting part, 30 appearance feature storage, 31 notification controller, 81 processing circuit, 82 processor, 83 memory, 91 on-board device, 92 server

The invention claimed is:

1. A driving authorization transfer determination device that determines whether transfer of driving authorization from an automated driving controller of a vehicle to a driver is acceptable or unacceptable, the device comprising:
   a processor to execute a program; and
   a memory to store the program which, when executed by the processor, performs processes of, making an output device inside the vehicle output a message that requests a performance of a task involving continuous body movement for a predetermined period of time, acquiring, in response to the message outputted by the output device, a track of a body of the driver on an operation surface or in an operation space inside the vehicle as an accomplishment result of the task from an input device inside the vehicle, determining whether the transfer is acceptable or unacceptable based on the accomplishment result of the task, and outputting a determination result as to whether the transfer is acceptable or unacceptable to the automated driving controller.

2. The driving authorization transfer determination device according to claim 1, wherein
whether the transfer is acceptable or unacceptable is determined based on a period of time required to accomplish the task.

3. The driving authorization transfer determination device according to claim 1, wherein
whether the transfer is acceptable or unacceptable is determined based on a comparison made between the track acquired as the accomplishment result of the task and a predetermined track.

4. The driving authorization transfer determination device according to claim 1, wherein
the task involves movement of a finger.

5. The driving authorization transfer determination device according to claim 4, wherein
whether the transfer is acceptable or unacceptable is determined based on change in speed of a track of a finger of the driver acquired as the accomplishment result of the task.

6. The driving authorization transfer determination device according to claim 1, wherein
a transfer acceptable/unacceptable determination request is acquired from the automated driving controller to determine whether the transfer is acceptable or unacceptable based on the transfer acceptable/unacceptable determination request before the vehicle reaches a point set on a travelling route at which the transfer of the driving authorization is intended.

7. A driving authorization transfer determination device that determines whether transfer of driving authorization from an automated driving controller of a vehicle to a driver is acceptable or unacceptable, the device comprising:
a processor to execute a program; and
a memory to store the program which, when executed by the processor, performs processes of,
making a display device inside the vehicle output a message that requests a performance of a task involving reading a sentence,
acquiring, in response to the message outputted by the display device, a voice of the driver reading the sentence as an accomplishment result of the task from an input device inside the vehicle,
determining whether the transfer is acceptable or unacceptable based on the accomplishment result of the task, and outputting a determination result as to whether the transfer is acceptable or unacceptable to the automated driving controller.

8. The driving authorization transfer determination device according to claim 7, wherein
whether the transfer is acceptable or unacceptable is determined based on a period of time required to accomplish the task.

9. The driving authorization transfer determination device according to claim 7, wherein
a transfer acceptable/unacceptable determination request is acquired from the automated driving controller to determine whether the transfer is acceptable or unacceptable based on the transfer acceptable/unacceptable determination request before the vehicle reaches a point set on a travelling route at which the transfer of the driving authorization is intended.

10. A driving authorization transfer determination device that determines whether transfer of driving authorization from an automated driving controller of a vehicle to a driver is acceptable or unacceptable, the device comprising:
a processor to execute a program; and
a memory to store the program which, when executed by the processor, performs processes of,
making an output device inside the vehicle output a message that requests a performance of a task involving continuous speech or body movement for a predetermined period of time,
acquiring, in response to the message outputted by the output device, an accomplishment result of the task from an input device inside the vehicle,
determining whether the transfer is acceptable or unacceptable based on the accomplishment result of the task,
outputting a determination result as to whether the transfer is acceptable or unacceptable to the automated driving controller,
extracting an appearance feature of the driver from a captured image of the driver, and
comparing the appearance feature after driving authorization was previously transferred with the current appearance feature, and if both the appearance features are different, notifying the output device of the difference before driving authorization is transferred from the automated driving controller to the driver.

11. The driving authorization transfer determination device according to claim 10, wherein
whether the transfer is acceptable or unacceptable is determined based on a period of time required to accomplish the task.

12. The driving authorization transfer determination device according to claim 10, wherein
a transfer acceptable/unacceptable determination request is acquired from the automated driving controller to determine whether the transfer is acceptable or unacceptable based on the transfer acceptable/unacceptable determination request before the vehicle reaches a point set on a travelling route at which the transfer of the driving authorization is intended.

* * * * *